Inventors:—
Per Gunnar Palmgren
Frederick S. Ball
by their Attorneys
Howson & Howson Inventors:-
Per Gunnar Palmgren
Frederick S. Ball
by their Attorneys
Howson & Howson Inventors:—
Per Gunnar Palmgren
Frederick S. Ball
by their Attorneys
Howson & Howson United States Patent Office 2,751,266
Patented June 19, 1956

2,751,266

DEVICE FOR DAMPING BY FLUIDS, THE WEAVING MOTION OF RAILWAY CARS

Per Gunnar Palmgren and Frederick S. Ball, Philadelphia, Pa., assignors to SKF Industries, Inc., Philadelphia, Pa., a corporation of Delaware Application July 10, 1950, Serial No. 172,854

17 Claims. (Cl. 308—180)

This invention relates to a journal box for railway axles, which box improves riding conditions.

A principal object of this invention is to provide a smooth ride by incorporating in the journal box one or more chambers in which the axle, by its unavoidable lateral, i. e. axial, movements, will change the pressure of the contained air, or other fluid medium; and by combining therewith a bearing assembly allowing such axle movements.

Another object is to provide clearance or channels through which fluids and/or semi-fluids may escape from said chambers to modify resistance of compression (or suction) into damping effect.

Another object is to relieve intensity of lateral shocks between rollers and roller abutments in the anti-friction bearing, and between brasses and thrust shoulders of plain bearings.

Another object is to restrain detrimental axial sliding of bearing surfaces over their whole axial lengths, as distinguished from non-damaging travel over a helical path.

Previous to this invention railway cars have ridden on axles equipped with plain bearings which slid sidewise through boxes between shoulders, or on anti-friction bearings which allowed no or only slight lateral movement. Plain bearings have produced generally smoother rides than anti-friction bearings, possibly because the lateral sliding offered less resistance to the unavoidable weaving among axles, trucks, and car bodies, than the locked-up, more firmly assembled relationship of anti-friction bearings and their boxes.

This invention frees anti-friction bearings from the locked-up condition by incorporating wider clearances between guide flanges in bearings having straight surfaced rollers, and protects the load bearing surfaces from undue sliding, by causing the axle motion to change the pressure of air, or other fluid media, in enclosed spaces at each end thereof. This organization cuts down very materially: lateral oscillation of the axle; sliding friction and wear of bearing surfaces; shocks to thrust shoulders; and factors of damage to passenger and lading, regardless of the type of bearing used.

Figure 8:
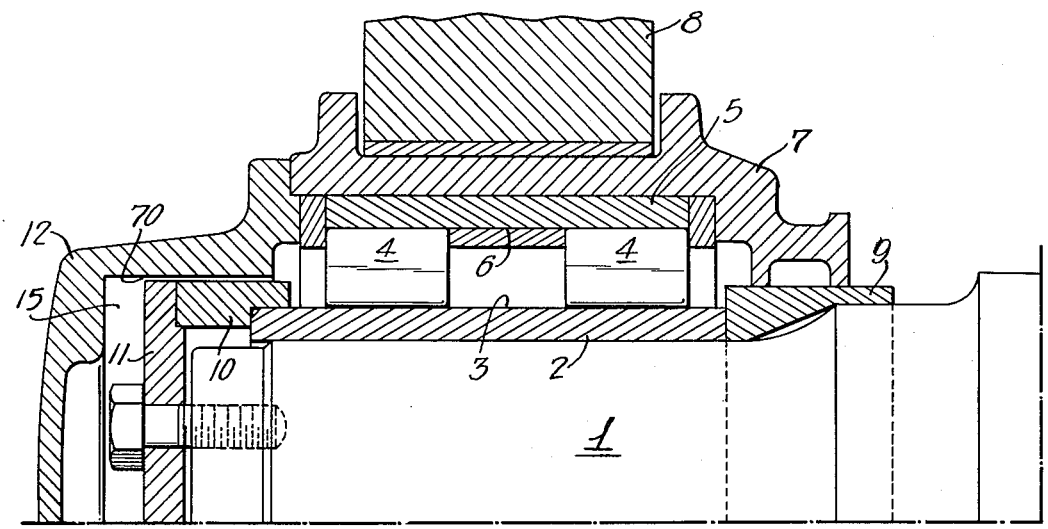
Figure 9:
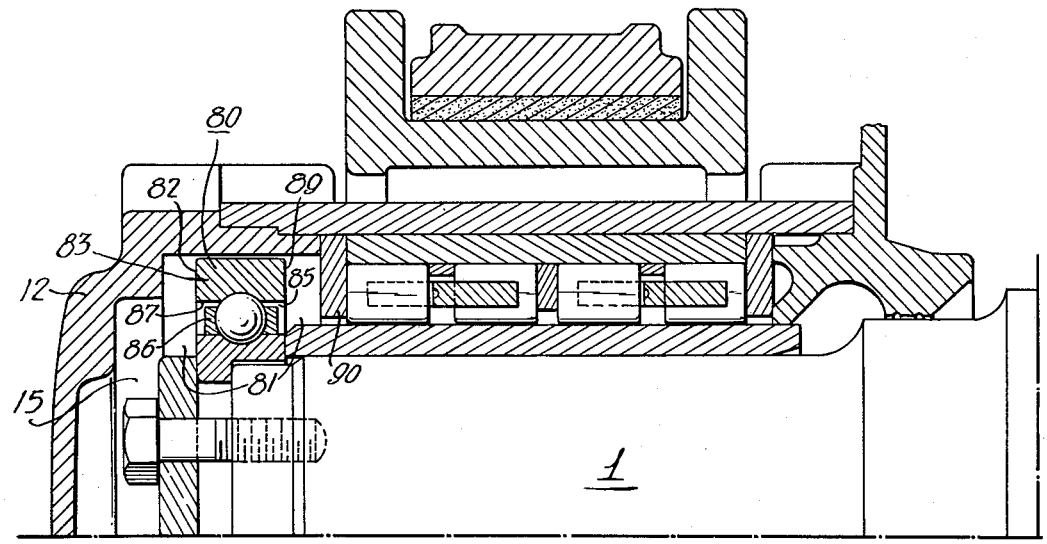

Fig. 8 is a sectional view of an assembly illustrating another modification in which provision is made for leakage of air through a small clearance of relatively great length from the compression chamber; and Fig. 9 is a sectional view showing still another modification of the invention wherein the cage of an anti-friction bearing forms an essential part of the inner wall of the compression chamber.

For a thorough understanding of this invention and its contribution to smoother riding of railway cars, it seems well to describe certain details of the phenomena taking place in contact surfaces between rollers and raceways, as the inner raceway rolls and moves transversely within surrounding rollers.

The bearings of the illustrated embodiments of this invention have cylindrical rollers, rolling externally on surface 3 and internally on surface 6 both cylindrical in form. Assuming the axes of all rollers to lie parallel with the coincident axes of the races, mutual contacts before loading will consist of straight lines. After loading they will consist of areas substantially rectangular in projection, slightly concave towards race bodies and slightly flattened towards roller bodies. Figures 4 to 7, inclusive, provide a schematic representation (not to scale) of these contacts under service load. They appear hugely exaggerated in order to illustrate elastic deformations which actually extend over very few thousandths of an inch in width and depth. In all these drawings, full lines represent intersections with the plane of the paper of unloaded and loaded portions of rollers and raceways. Dashed lines represent the original shapes of the cylinders. Dash and dot lines represent the position of a roller after moving horizontally left under the influence of tangential pressure.

Figure 4:
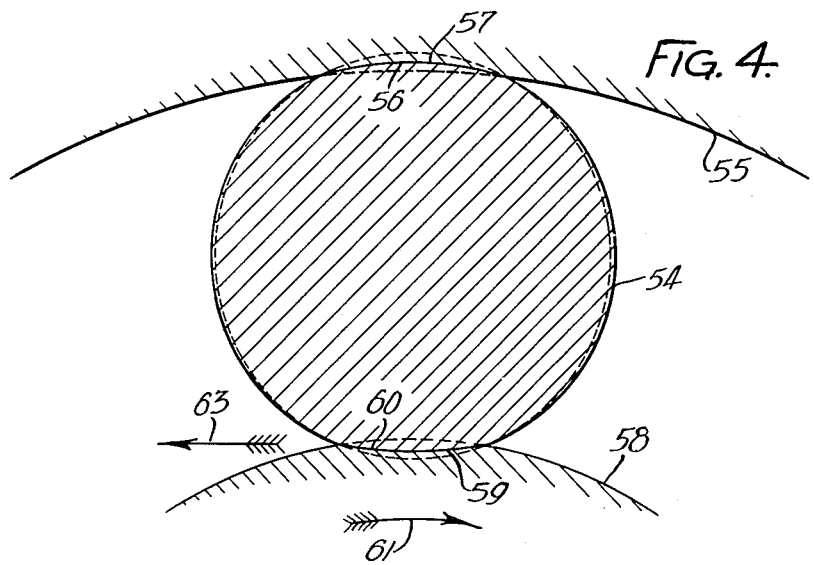
Fig. 4 is an enlarged diagrammatic sectional view on the line 4—4, Fig. 1, with the bearing under load.
Figure 6:
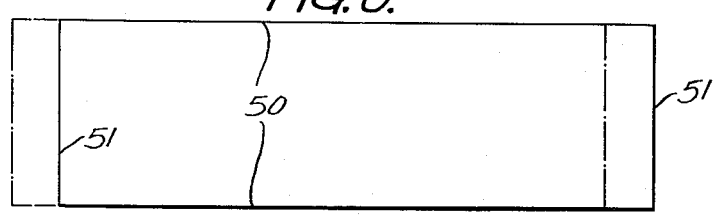
Fig. 6 is a diagrammatic plan view showing the form of the contact area under load of the outer raceway with one of the rollers.
Figure 7:
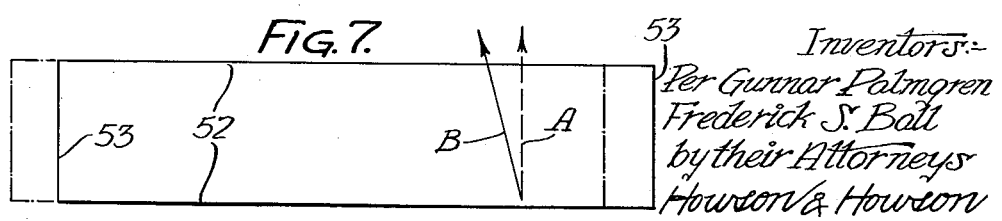
Fig. 7 is a diagrammatic plan view showing the form of the contact area under load of the inner raceway with the said roller.

Figure 6 shows the projected outlines of outer race contact defined by full lines 50 for the sides and 51 for the ends. Similarly, Figure 7 shows the projected outline of the inner race contact as defined by lines 52 for the sides and 53 for the ends. Figure 4 depicts the cross section cut by plane 4—4 through the roller and the contacts of its undistorted surface 54, with the two raceways. Surfaces 57 and 59 represent load flattened roller surface 54 indenting undistorted outer race surface 55 as indicated by 56, and indenting undistorted inner race surface 58 as indicated by 60.

Figure 5:
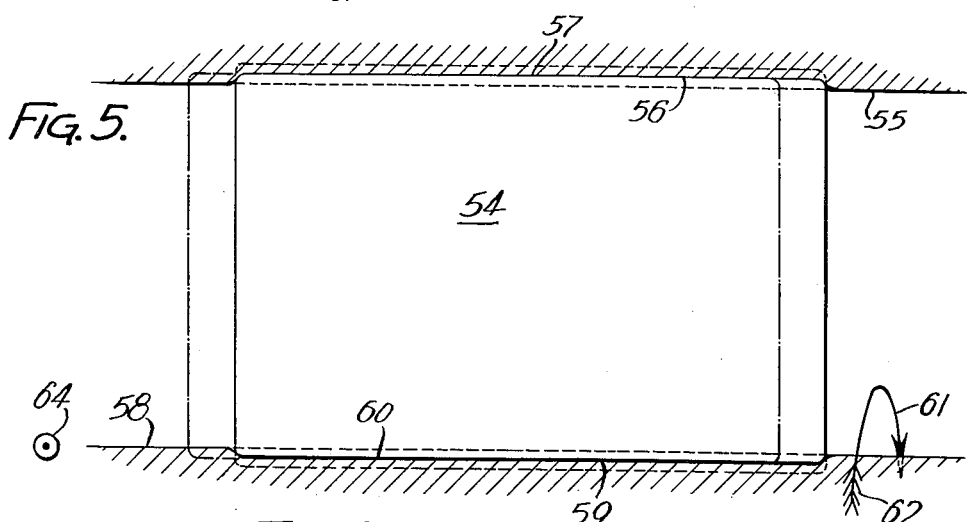
Fig. 5 is an enlarged view of a fragmentary part of Fig. 1 showing the deformations under load of the contact surfaces of the inner and outer raceways with one of the rollers.

In operation, the inner race turns clockwise for example, as indicated by arrow 61 in Figure 4 and by the tail of that arrow 62 in Figure 5. In turning it meets rolling frictional resistance principally attributable to the necessity of deforming the original cylindrical surfaces. Rolling frictional resistance acts horizontally as indicated by arrow 63 in Figure 4 and by its point 64 in Figure 5.

The transverse motion of the axle, from right to left for example in Figure 6, acts to deflect the whole contact surface slightly to the left, before sliding occurs. Because of this deflection the roller may travel a helical path deviating from the straight forward circumferential direction by an angle usually less than 1°. By this action the roller appears to slide in the axial direction, but does not, hence it is termed "apparent sliding." It travels a helical path indicated on exaggerated scale by the divergence between arrow A, Fig. 7, representing straight forward rolling and arrow B representing actual motion on a helical path. In this helical path it encounters only resistance of low degree, comparable with rolling friction. These axial deflections take place only because of an axially directed force which may increase as transverse speed of the axle increases in relation to its rotational speed, until it exceeds the sliding frictional resistance of the roller. When pure sliding occurs, danger of scoring arises.

This invention provides the additional resistance of displacement and/or compression of fluid, to prevent (or lessen) such detrimental sliding, and thus preferably to keep the roller traveling within a safe angular range. Experience has shown that bearings suffer no scoring when rolling stays within permissible angles of deviation.

In order to simplify explanations and to avoid repetition of alternative expressions, the following text discloses, as an example, the use of air as a fluid medium brought under increased and/or reduced pressure. It is intended that the reader understand: That the pressure built up by advance of the axle, will reduce to atmosphere or below, by retreat of the axle; that pressure below atmosphere retards motion of the axle as effectively as pressure above; that other fluids including oil, grease or combinations thereof with air, will provide suitable resilience and damping effects; that spaces completely or partially filled with so-called incompressible fluids, including grease and oil, can discharge only such amount thereof as other connecting spaces will accommodate.

In the drawings: 1 represents a railway axle, 2 a sleeve press-fitted to the axle and having a cylindrical surface 3 on which the rollers 4 roll while moving axially to accommodate sidewise movements of the axle; 5 a sleeve in the box having an internal cylindrical surface 6 embracing the rollers; 7 the journal box; 8 one of the truck side frames; 9 an abutment ring limiting motion of the rollers 4 to the right; and 10 an abutment ring limiting motion of the rollers to the left. A plate 11 attached to the end of the axle forms within journal box cover 12 a chamber in which movement of the axle to the left compresses air to a pressure depending upon the ratio of maximum to minimum volumes of the space between plate 11 and cover 12. The maximum volume occurs when the axle has traveled its full journey to the right, the minimum volume when the axle has reached its farthest position to the left. Leakage through clearance space 13 lessens pressure and serves to provide regulation. Complete closure of the chamber would produce a high degree of resilient rebound. Clearances continuously reduce pressure and introduce controllable effects comprising resistance fading away with lapse of time.

Figure 1:
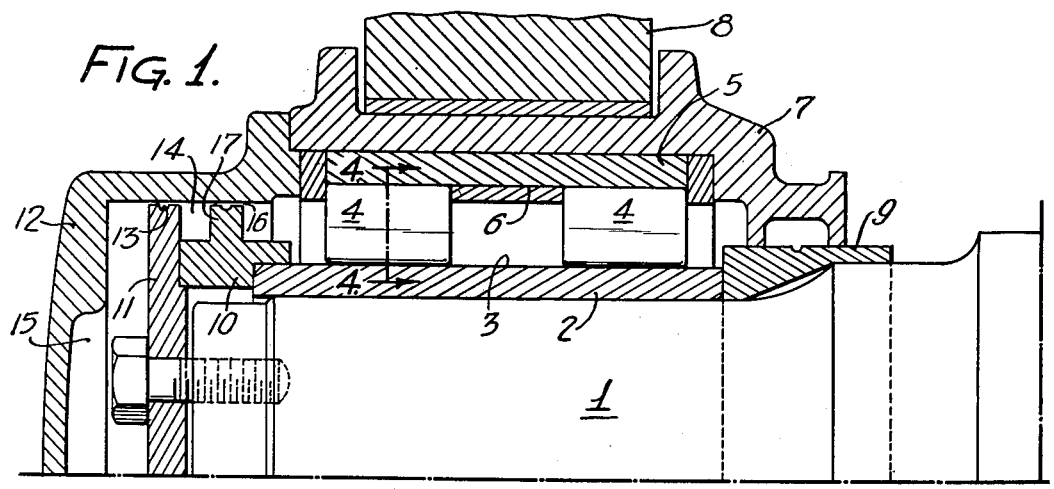
Fig. 1 is a cross sectional view of a railway axle assembly equipped with cylindrical rollers having clearances at each end of the inner race for motion transversely to the tracks, and including members forming compression chambers.
Figure 2:
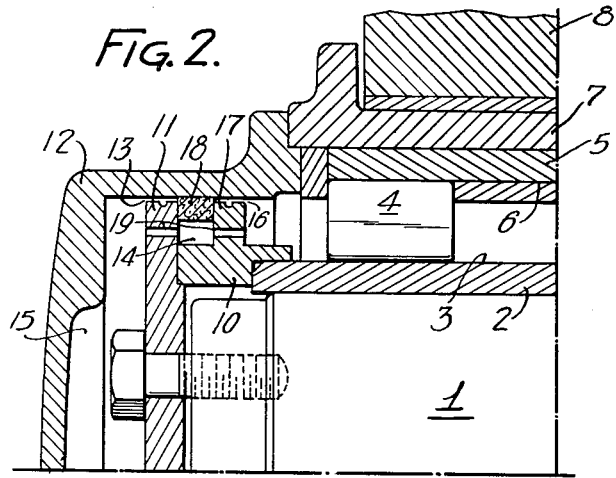
Fig. 2 is a fragmentary sectional view similar to Fig. 1 showing a modification within the scope of the invention.

The embodiments of Figures 1 and 2 have a second chamber 14 into which pressure from chamber 15 leaks and builds up as controlled by clearance 16 surrounding its inner wall 17, here shown as integral with ring 10, but which may be a separate piece.

Figure 2 depicts a modification incorporating a piston ring 18 between walls 11 and 17, and a number of drilled holes 19. Except for the release of air through the holes, the piston ring would by itself retain substantially all the air in chamber 15. Proper selection of number and size of holes provides closer control of damping than dependence upon clearances 13 and 16 determined by comparatively rough finishes in the bore of the cover and/or the outer peripheries of rings 11 and 17. A felt ring between walls 11 and 17 in place of the piston ring will work well in some applications. The felt does not restrict air flow so much as the metal piston ring.

Figure 3:
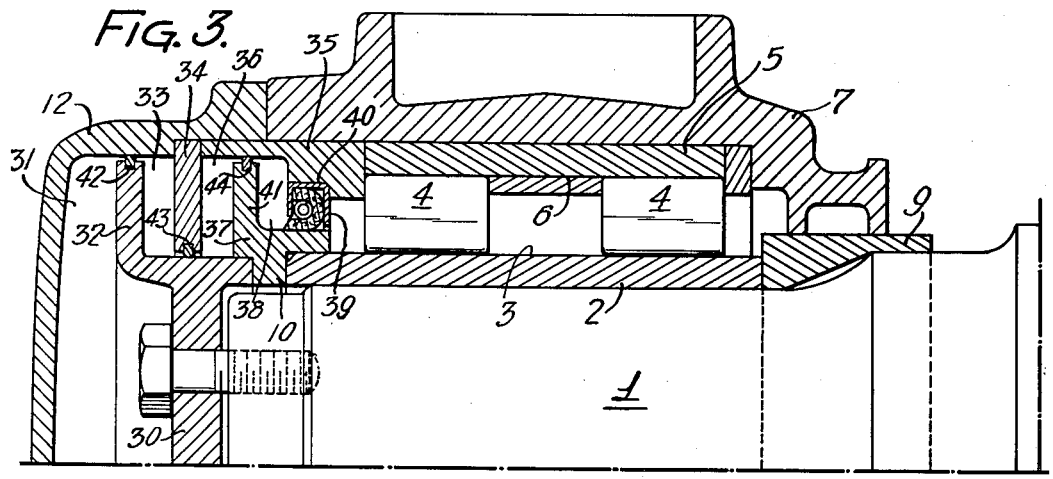
Fig. 3 is a vertical cross sectional view of a railway axle assembly showing another embodiment of the invention.

Figure 3 shows an organization which adds more chambers in which the axle movement will alternatively raise and reduce fluid pressure, thus providing greater retarding forces than the previous arrangements. Plate 30 attached to the end of the axle, forms a chamber 31 with cover 12. Flange 32 of plate 30, forms a second chamber 33 between its inboard face and disc 34 sealingly held between the cover and outer race roller abutment ring 35. The latter disc forms a third chamber 36 between its inboard wall and inner race abutment ring 37 which in its turn forms a fourth chamber 38 with outer race abutment ring 35 and cup seal 39 installed within the counterbore 40.

When the axle moves left, plate 30 with its flange 32, and ring 37 with its flange 41, decreases the volume of and increases the pressure in chambers 31 and 36. The same axle movement, simultaneously increases volumes and decreases pressures in chambers 33 and 38. Since change of pressure above or below atmosphere absorbs energy from the axle motion, each one of these chambers will act to check axle oscillation. Piston rings 42, 43, and 44 reduce leakage between chambers and thus materially raise their resilience. Return movement of the axle toward the right reduces pressures in 31 and 36, and raises pressures in 33 and 38. The first portion of the latter movement restores pressures to atmosphere but thereafter produces equal checking effects in direction opposite to the previous example.

Due to clearances between rails and wheel flanges required to permit car trucks to go around curves, and to the more or less loose conections between truck members, weaving motions take place among all these parts. It continues as long as the train travels. Naturally the car body will show the greatest degree of displacement with respect to the axle while other members of the chain connecting these two end members will have displacements of lesser degree depending upon the type of connection, whether by loosely-fitting lugs, by springs, or by firm fastening. Passenger cars have expensive equipment with more springs and less looseness between truck members than freight cars which have a minimum number of springs and unmachined members assembled into trucks with necessarily ample clearances between them.

Anti-friction bearing engineers have made reasonably successful applications to passenger cars of their bearings mounted to form firm connections between axle and box. Springs and other devices protected bearings from detrimental relative sliding of parts. Riding qualities satisfied railroad engineers until the advent of modern high speeds.

Railroads heretofore have bought few anti-friction bearings for freight cars because of prohibitive cost but have changed that attitude to meet increased factors of damage to lading resulting from the greatly increased speeds of freight trains.

The aforesaid lateral movements of bodies create heavy axially-directed forces on various thrust surfaces, when a wheel flange reaches the end of its motion with respect to its adjacent rail, caused by arresting the inertias of all parts in the chain to one side of bearing rollers, or of the brass pillow in the case of a plain bearing. The greatest force occurs during lateral motion of the axle and inner race when roller abutments strike roller ends or the pillows strike thrust shoulders. The value of the force equals the product of the total mass in all parts involved, multiplied by the original velocity, and divided by the time required to bring that mass to a stop. The cylindrical roller bearings incorporated in Figures 1, 2, 3, 8 and 9 show the axle in its central position in the box with clearances between outboard ends of the rollers and adjacent abutments. These clearances compare with those of plain bearings between thrust surfaces and brasses.

Some embodiments of this invention, as described above, provide a damping effect by allowing a portion of the air compressed in a chamber by the moving axle, to escape. Completely entrapped air would have a high degree of elastic resilience which could completely prevent contact between rollers and inner race roller abutments, and thus relieve bearings of thrust loads. That type of compression would return the axle to the right at substantially the same speed as it moved to the left. Such action would cut down weaving among the several parts but could increase the tendency to rhythmic vibration. Escape of air will regulate the elasticity to whatever extent desired. Thus this invention provides resistance to lateral forces fading away with lapse of time so as not always to prevent ends of rollers from receiving lateral loads. In other words, compression of air retards approach of roller ends toward abutments, and extends the time consumed in bringing the aforesaid parts to rest, and thus reduces not only sharpness of blows but also the amount of lateral loads. It improves riding qualities when associated with any type of bearing.

Instead of piston rings between walls 11 and 17, Fig. 2, leather or rubber cups could be used at the edges of the walls.

Figure 8 shows an organization in which a narrowly restricted clearance 70 between inner race abutment ring 10 and cover 12, causes air pressure to build up in compression chamber 15. The restriction extends over a long surface in order to hinder flow by increasing frictional resistance and thus absorb some of the energy stored in the moving axle.

Figure 9 shows a modification in which an annular ball bearing 80 attached to the end of the axle 1 (shown in its central position) moves back and forth within space 81 between cover 12 and abutment 90. When left face 82 of its outer race 83 comes against cover 12 the ball bearing has considerably reduced space 15. Close clearances 85 outwardly between bearing cage 86 and race lands 87, will leakingly compress air in a manner similar to previous arrangements. When right face 89 comes against the roller abutment 90, the ball bearing has enlarged space 15 and caused a reduction of pressure. Both pressure and suction act to retard endwise motion of the axle in the desired manner. Space within this ball bearing not occupied by balls and cage, provides a receiving chamber for compressed air and obviously similar space in the roller bearing could be enclosed by an appropriate cage for the same purpose.

In all drawings depicting applications, the axle occupies the middle position between the two extremes in which either the right wheel flange or the left wheel flange touches its adjacent rail, and the above disclosures assume atmospheric pressure to exist throughout the journal box under that condition. Obviously, service conditions could produce atmospheric pressure at any other axle position, and when axle movement to the left produces pressure in left axle end chambers, it also tends to produce partial vacuums in right axle end chambers. Both of these pressure conditions will retard axle motion.

In reference to the appended claims, it will be understood that, the plate elements 11 and 30 and the corresponding elements of the other embodiments of the invention which are attached to and are movable with the axle are considered as constituting in effect an integral part of the latter except where otherwise specifically indicated.

We claim:

1. A railway axle journal assembly comprising in combination a journal box including a bearing, an axle extending into the box and fitted to said bearing, said axle having freedom for axial movement in the box, and a chamber between the axle and inner surfaces of said box and containing a fluid damping medium and forming with said axle a dash pot in which the fluid medium operates to damp the said movements of the axle.

2. A journal assembly according to claim 1 wherein a predetermined clearance is provided between the wall of the chamber and the axle for regulated flow of the fluid to and from the chamber as the axle withdraws from and advances into the chamber respectively.

3. A railway axle journal assembly comprising a journal box including a bearing, an axle extending into the box and fitted to said bearing, said axle having freedom for axial movement in the box, and fluid pressure means for damping said movements, said damping means comprising a chamber in the end of said box embracing the end of the axle and containing a fluid damping medium, the said end of the axle and the chamber constituting a dash pot in which the fluid medium operates to damp the movements of the axle.

4. A journal assembly according to claim 3 wherein a predetermined clearance is provided between the wall of the chamber and the confronting surface of the axle for regulated flow of the fluid to and from the chamber as the movements of the axle increase and decrease the effective size of the chamber.

5. A railway axle journal assembly comprising in combination a journal box including a bearing, an axle extending into one end of the box and fitted to said bearing, the other end of the box being sealed, said axle having freedom of axial movement in the box, the end of the axle being fitted to the interior of the box so as to form within the sealed end of the latter a fluid pressure chamber the fluid contents of which are placed under variable pressures by the said axial movements of the axle.

6. A journal assembly according to claim 5 wherein a predetermined clearance is provided between the side wall of said chamber and the confronting surface of the axle so as to afford a regulated flow of the fluid medium to and from the chamber.

7. A journal assembly according to claim 6 including a supplemental chamber between the confronting walls of the box and axle adjoining the chamber first named, and communicating with the latter by way of said clearance space.

8. A journal assembly according to claim 7 including a plurality of supplementary chambers arranged in axial series and communicating with each other by way of predetermined clearance spaces affording regulated flow of the fluid between the chambers.

9. A journal assembly according to claim 5 wherein the axle is provided at its end with a plate member which extends radially into proximity to the confronting side wall of the chamber to form the inner movable wall of the latter.

10. A journal assembly according to claim 9 wherein the said axle carries axially spaced walls each extending radially into proximity to the confronting side wall of the chamber and forming therebetween a supplemental pressure chamber communicating with the chamber first named.

11. A railway axle journal assembly comprising in combination a journal box including a bearing, an axle extending into one end of the box and fitted to said bearing, the other end of the box being sealed, said bearing including an anti-friction bearing element having an inner race ring secured to the end of the axle and an outer race ring in proximity to a cylindrical surface of the box confronting the said axle, said bearing forming in effect the inner movable wall of a chamber in the sealed end of said box the fluid contents of which are subjected to variable pressures by the axial movements of the axle.

12. A journal assembly according to claim 5 wherein the end of the axle has axially spaced radial flanges extending into proximity to the confronting wall of the box, and wherein also the said box wall is provided with a flange which extends inwardly between the spaced flanges of the axle and into proximity to the confronting surface of the latter so as to form a plurality of the said pressure chambers in axially disposed communicating series.

13. A railway axle journal assembly comprising a journal box including an antifriction bearing having inner and outer race rings, one of said rings being fitted in said box, an axle extending into the box and fitted to the other of said rings, said other ring having freedom for axial movement in the box, and fluid pressure means for damping said movements, said damping means comprising a chamber in the end of said box embracing the end of the axle and containing a fluid damping medium, the said end of the axle and the chamber constituting a dashpot in which the fluid medium operates to damp the movements of the axle.

14. A railway axle journal assembly comprising in combination a journal box including an antifriction bearing having inner and outer race rings, one of said rings being fitted in said box, an axle extending into the one end of the box and fitted to said other of said rings, the other end of the box being sealed, said other ring having freedom for axial movement in the box, the end of the axle being fitted to the interior of the box so as to form within the sealed end of the latter a fluid pressure chamber the fluid contents of which are placed under variable pressures by the said axial movements of the axle.

15. A railway axle journal assembly comprising in combination a journal box including a bearing, an axle extending into one end of the box and fitted to said bearing, the other end of the box being sealed, said axle having freedom for axial movement in the box, the end of the axle having portions of different radial dimensions fitted to the interior of the box so as to form within the sealed end of the latter a plurality of fluid pressure chambers arranged in axial series and communicating with each other by way of predetermined clearance spaces provided between the interior walls of said box and the confronting surfaces of the axle so as to afford a regulated flow of the fluid medium to and from the chambers, the fluid contents of said chambers being placed under variable pressures by the said axial movements of the axle.

16. A railway axle journal assembly comprising in combination a journal box including a bearing, an axle extending into one end of the box and fitted to said bearing, the other end of the box being sealed, said axle having freedom for axial movement in the box, the end of the axle being provided with a plate member which extends radially into proximity to the confronting sidewall of the box so as to form within the sealed end of the latter a fluid pressure chamber the fluid contents of which are placed under variable pressures by the said axle movements of the axle.

17. A railway axle journal assembly comprising in combination a journal box including a bearing, an axle extending into one end of the box and fitted to said bearing, the other end of the box being sealed, said axle having freedom for axial movement in the box, the end of the axle being fitted to the interior of the box so as to form within the sealed end of the latter a fluid pressure chamber and having axially spaced radial flanges extending into proximity to the confronting wall of the box, the said box wall being provided with a flange which extends inwardly between the spaced flanges of the axle and into proximity to the confronting surface of the latter so as to form a plurality of said pressure chambers in axially disposed communicating series the fluid contents of which are placed under variable pressures by the said axial movements of the axle.

References Cited in the file of this patent

UNITED STATES PATENTS

| | | |
|---|---|---|
| 1,355,217 | Doran | Oct. 12, 1920 |
| 1,451,148 | Floring | Apr. 10, 1923 |
| 1,953,819 | Payne | Apr. 3, 1934 |
| 2,185,664 | Harry | Jan. 2, 1940 |
| 2,337,795 | Austin | Dec. 28, 1943 |
| 2,365,875 | Hersey et al. | Dec. 26, 1944 |
| 2,395,888 | Lewis | Mar. 5, 1946 |
| 2,573,159 | Noe | Oct. 30, 1951 |
| 2,593,919 | Reynolds | Apr. 22, 1952 |

FOREIGN PATENTS

| | | |
|---|---|---|
| 299,810 | Great Britain | Oct. 17, 1929 |